United States Patent
Lin et al.

(10) Patent No.: US 8,837,167 B2
(45) Date of Patent: Sep. 16, 2014

(54) ELECTRONIC DEVICE WITH CARD HOLDER

(75) Inventors: Chun-Jen Lin, New Taipei (TW);
Mi-Chien Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 328 days.

(21) Appl. No.: 13/291,203

(22) Filed: Nov. 8, 2011

(65) Prior Publication Data

US 2012/0188739 A1  Jul. 26, 2012

(30) Foreign Application Priority Data

Jan. 26, 2011  (CN) .......................... 2011 1 0025845

(51) Int. Cl.
*H05K 7/02* (2006.01)
*G06K 13/08* (2006.01)

(52) U.S. Cl.
CPC .................................. *G06K 13/0825* (2013.01)
USPC ....... 361/807; 361/759; 361/741; 361/679.01

(58) Field of Classification Search
CPC . G06K 13/0825; G06K 7/0021; G06K 19/00; G06K 19/005; G06K 7/0047; H01R 24/00; H01R 13/443; H01R 13/629; H01R 13/635; H05K 5/0256; H05K 5/0265; H05K 5/0269; H05K 5/0295; H05K 5/0286; H05K 7/142
USPC ......................................... 439/532, 729, 716
See application file for complete search history.

(56) References Cited

U.S. PATENT DOCUMENTS

| 4,780,793 | A * | 10/1988 | Ohtsuki ......................... 361/756 |
| 6,269,005 | B1 * | 7/2001 | Tung et al. .................... 361/737 |
| 6,602,096 | B1 * | 8/2003 | Kronestedt et al. ........... 439/630 |
| 2002/0001181 | A1 * | 1/2002 | Kondo .......................... 361/728 |
| 2006/0154506 | A1 * | 7/2006 | Kikuchi et al. ............... 439/159 |
| 2008/0132120 | A1 * | 6/2008 | Tsai ............................... 439/630 |
| 2009/0117763 | A1 * | 5/2009 | Chen ............................. 439/148 |
| 2011/0249385 | A1 * | 10/2011 | Zhang et al. ............... 361/679.4 |

* cited by examiner

*Primary Examiner* — Tuan T Dinh
*Assistant Examiner* — Steven T Sawyer
(74) *Attorney, Agent, or Firm* — Novak Druce Connolly Bove + Quigg LLP

(57) ABSTRACT

An electronic device includes a card holder for receiving a chip card, and a housing defining a receiving groove for receiving the card holder. The card holder includes a fixing member and a receiving base positioned on the fixing member. The fixing member includes a base plate and a side wall substantially perpendicularly extending from an end of the base plate. The base plate forms a first positioning bar and a second positioning bar substantially parallel to each other, and the second positioning bar defines a positioning cutout. The receiving base is positioned on the fixing member. The receiving base forms a positioning hook, and the positioning hook has a locking protrusion engaging in the positioning cutout of the second positioning bar. The positioning hook is capable of being deformed to make the locking portion disengage from the positioning cutout.

16 Claims, 6 Drawing Sheets

ELECTRONIC DEVICE WITH CARD HOLDER

BACKGROUND

1. Technical Field

The present disclosure generally relates to electronic devices, and particularly, to an electronic device with a card holder.

2. Description of the Related Art

Chip cards are widely used in electronic devices, such as mobile phones and MP3 players, for example. An electronic device generally includes a housing, a battery, and a battery cover fastening the battery to the housing. A chip card, such as a SIM card and a memory card, is positioned between the battery and the housing. If a user wants to take the chip card out of the electronic device, the battery and the battery cover needs to be disengaged from the housing first, and then the chip card can be disengaged from the housing. Therefore, it is inconvenient to disassemble the chip card from the housing.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
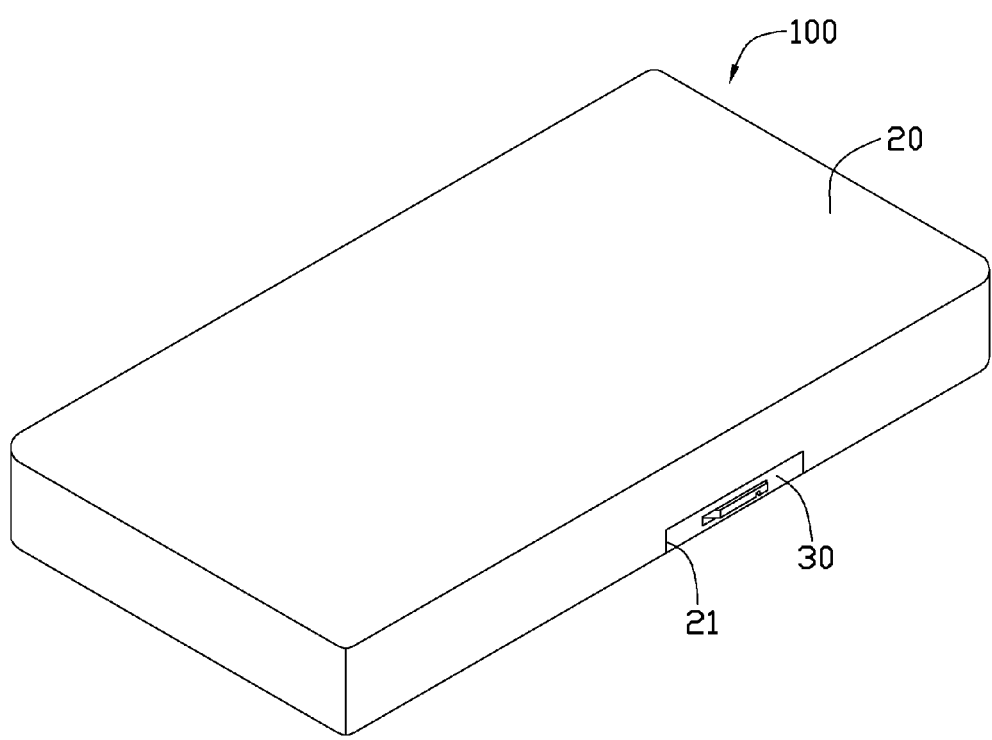
FIG. 1 is an isometric view of an embodiment of an electronic device including a housing and a card holder.
Figure 2:
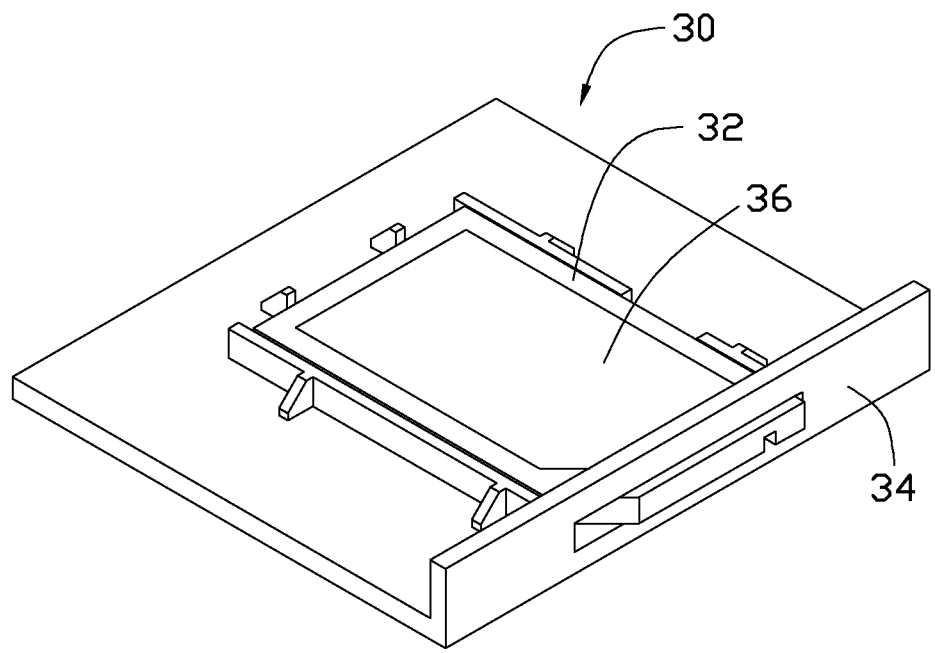
FIG. 2 is an isometric view of the card holder of FIG. 1 receiving a card chip.

Referring to FIGS. 1 and 2, an embodiment of an electronic device 100 includes a housing 20 and a card holder 30. The housing 20 defines a receiving groove 21 for receiving the card holder 30. The card holder 30 receives a chip card 36. The electronic device 100 may be a mobile phone, a MP3 player, a notebook computer, or a camera, for example.

Figure 3:
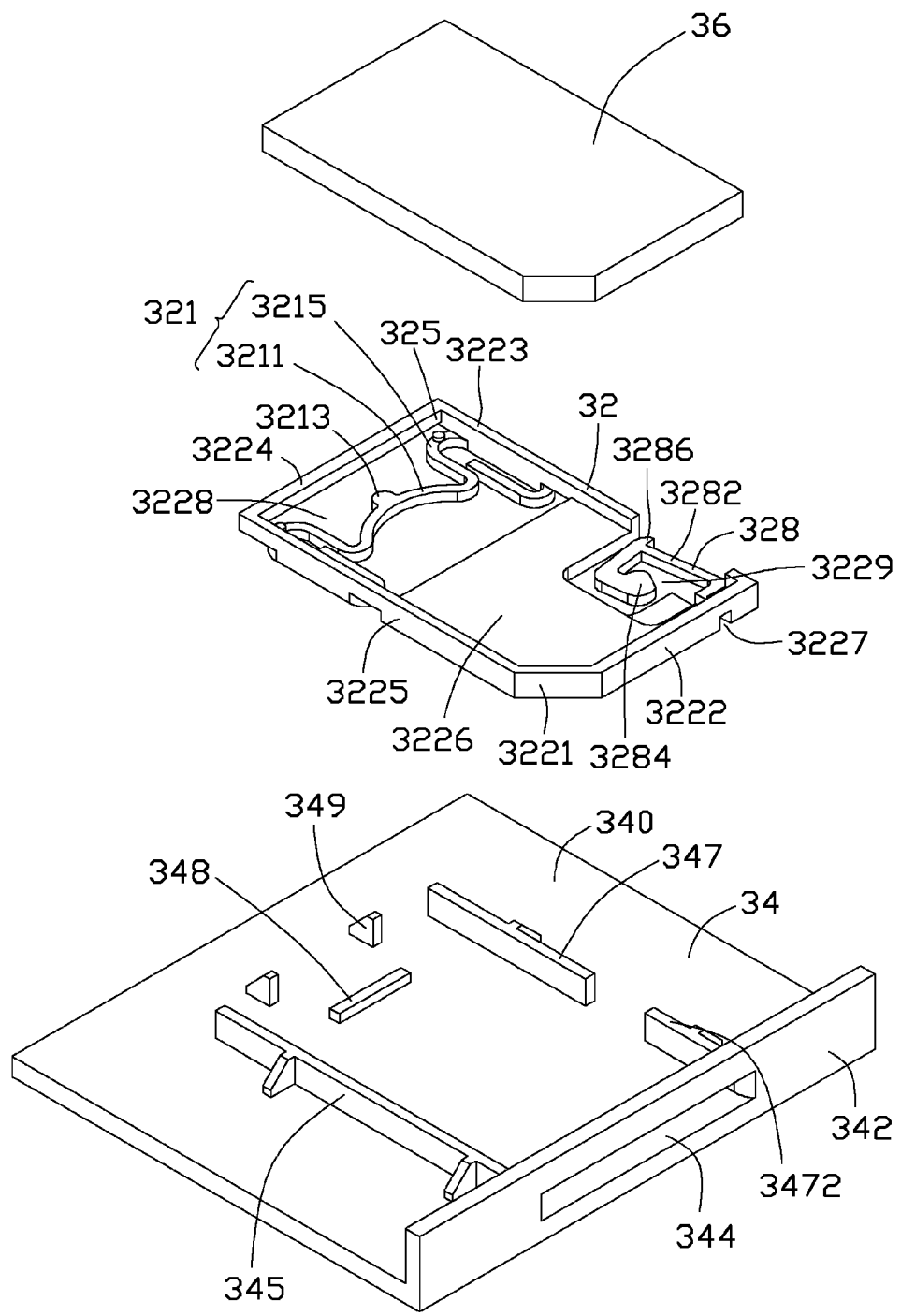
FIG. 3 is an exploded, isometric view of the card holder of FIG. 2.
Figure 4:
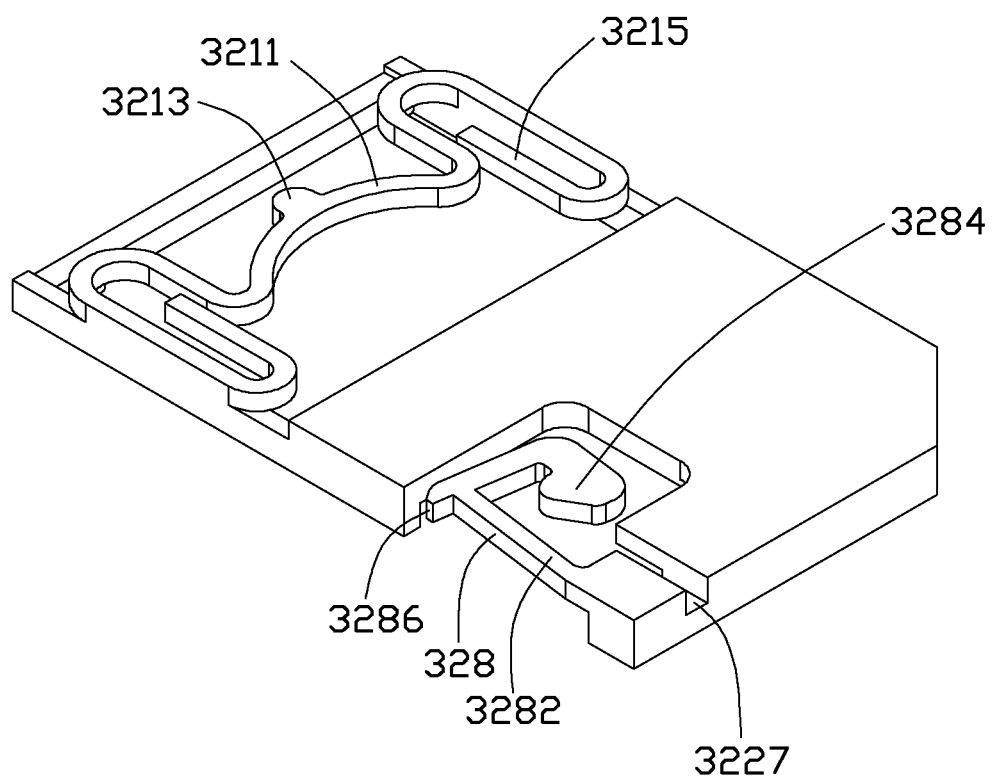
FIG. 4 is an isometric view of a receiving base of the card holder of FIG. 3.

Referring to FIGS. 2 through 4, the card holder 30 includes a receiving base 32 and a fixing member 34. The receiving base 32 receives the chip card 36, and the shape of the receiving base 32 is substantially pentagonal, thereby corresponding to the chip card 36. The receiving base 32 is integrally formed, and includes a first side plate 3221, a second side plate 3222, a third side plate 3223, a fourth side plate 3224, a fifth side plate 3225, and a bottom plate 3326. The first, second, third, fourth, fifth side plates 3221, 3222, 3223, 3224, 3225 and the bottom plate 3326 cooperatively define a receiving groove 325 receiving the chip card 36. The bottom plate 3326 defines a through hole 3228 in an end of the bottom plate 3326 adjacent to the fourth side plate 3224, and forms an elastic member 321 across the through hole 3228. The bottom plate 3326 further defines a cutout 3229 in an end thereof adjacent to the second side plate 3222, and forms a positioning hook 328 in the cutout 3229. In the illustrated embodiment, the receiving base 32 is made of plastic, so as to reduce manufacturing costs. In other embodiments, the receiving base 32 may also be made of metal.

In the illustrated embodiment, the elastic member 321 includes a first arc portion 3211 and two second arc portions 3215 respectively connected to opposite ends of the first arc portion 3211. The second arc portions 3215 are connected to the third side plate 3223 and the fifth side plate 3225, respectively. The first arc portion 3211 forms a protrusion 3213 opposite to the fourth side plate 3224.

The positioning hook 328 includes an elastic arm 3282 and an unlocking portion 3284 connected to an end of the elastic arm 3282. The elastic arm 3282 is connected to the second side plate 3222, and an end of the elastic arm 3282 connected to the unlocking portion 3284 forms a locking protrusion 3286. The second side plate 3222 defines an unlocking hole 3227 in an end thereof adjacent to the elastic arm 3282.

Figure 5:
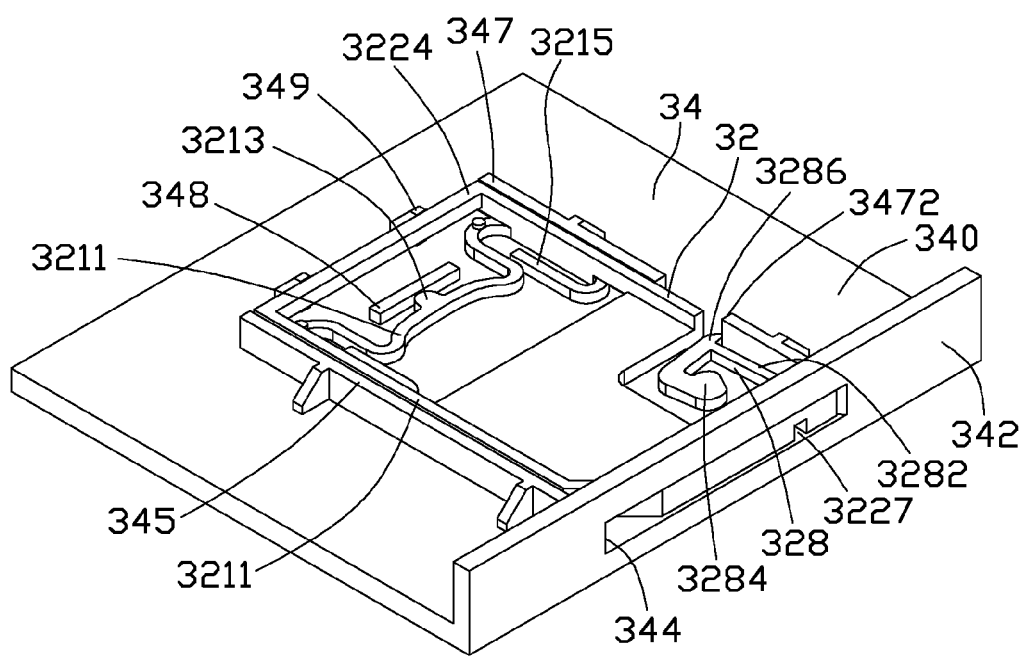
FIG. 5 is an isometric view of the card holder of FIG. 2 in a locking state

The fixing member 34 is substantially L-shaped, and integrally formed with the housing 20 in the illustrated embodiment. The fixing member 34 includes a base plate 340 and a side wall 342 substantially perpendicularly extending from an end of the base plate 340. Referring to FIG. 5, the side wall 342 defines a restricting groove 344 for assembling the receiving base 32.

The base plate 340 forms a first positioning bar 345 and a second positioning bar 347; the first positioning bar 345 and the second positioning bar 347 are connected to the side wall 342, respectively, and are substantially parallel to each other. The second positioning bar 347 defines a positioning cutout 3472 for receiving the locking protrusion 3286 of the positioning hook 328. A resisting portion 348 and two restricting portions 349 are formed between the first positioning bar 345 and the second positioning bar 347, and the restricting portions 349 are positioned at a side of the resisting portion 348 away from the side wall 342.

Referring to FIGS. 2 through 5, in assembly of the chip card 36 to the card holder 30, the chip card 36 is positioned in the receiving base 32. The receiving base 32 is inserted into the restricting groove 344 of the fixing member 34 from outside of the fixing member 34. The receiving base 32 slides along the first positioning bar 345 and the second positioning bar 347, with the positioning hook 328 elastically deformed and attached to the second positioning bar 347, until the positioning hook 328 reaches the positioning cutout 3472. Then, the positioning hook 328 elastically releases from deformation and the locking protrusion 3286 engages in the positioning cutout 3472. The elastic member 321 is elastically deformed with the protrusion 3213 resisting the resisting portion 348, and the fourth side plate 3224 resists the restricting portions 349. Therefore, the receiving base 32 together with the chip card 36 are positioned on the fixing member 34.

Figure 6:
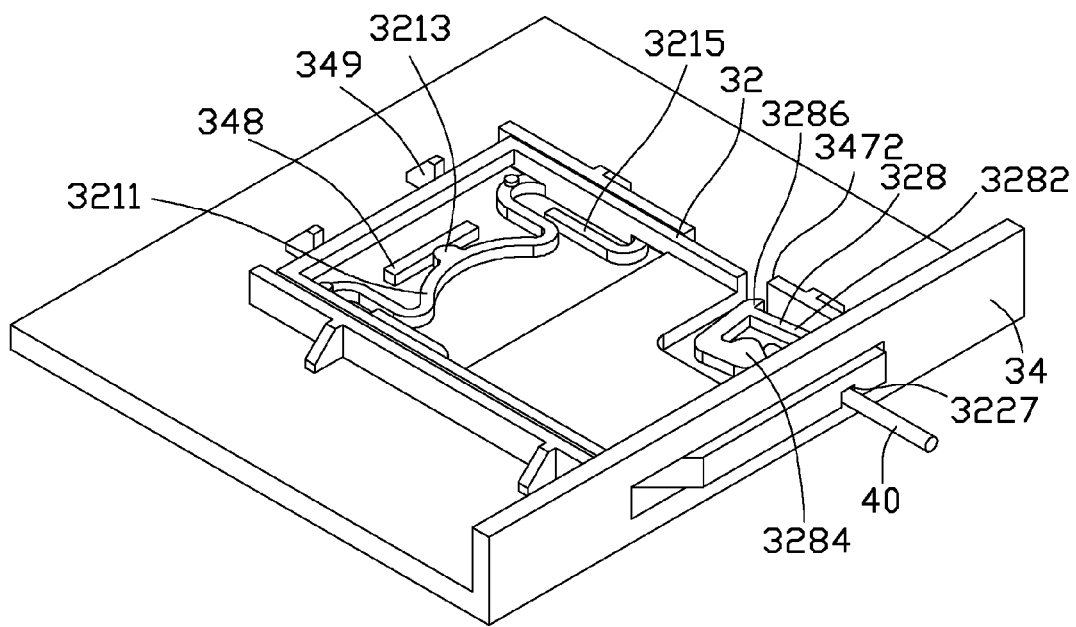
FIG. 6 is an isometric view of the card holder of FIG. 2 in an unlocking state.

Referring to FIG. 6, when the chip card 36 needs to be disengaged from the card holder 30, an unlocking member 40 is extended through the unlocking hole 3227 of the second side plate 3222, and resists the unlocking portion 3284, such that the elastic member 321 is elastically deformed, and the locking protrusion 3286 disengages from the positioning cutout 3472 of the second positioning bar 347. Then, the elastic member 321 releases from deformation to drive the receiving base 32 to partially slide out of the restricting groove 344 of the fixing member 34. Therefore, the receiving base 32 can be withdrawn out of the fixing member 34, such that the chip card 36 can then be taken out of the receiving base 32.

The receiving base 32 forms the elastic member 321 to resist the resisting portion 348 and the positioning hook 328 to engage the positioning cutout 3472, thereby positioning the receiving base 32 on the fixing member 34. Therefore, the receiving base 32 has a simpler structure and can be easily assembled. In addition, the elastic member 321 has the first arc portion 3211 and the two second arc portions 3215 respectively connected to opposite ends of the first arc portion 3211 (Refer to FIG. 3), thus the first arc portion 3211 can be protected from over-deformation via the second arc portions 3215, and can generate a relatively greater elastic force. Accordingly, the elastic member 321 has a longer service life.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A card holder, comprising:
a fixing member comprising a base plate and a side wall substantially perpendicularly extending from an end of the base plate, wherein the base plate forms a first positioning bar and a second positioning bar, the first positioning bar and the second positioning bar are substantially parallel to each other, and the second positioning bar defines a positioning cutout, the side wall defines a restricting groove; and
a receiving base positioned on the fixing member and partially received in the restricting groove, wherein the receiving base forms a positioning hook, the positioning hook has a locking protrusion engaging in the positioning cutout of the second positioning bar, and the positioning hook is elastically deformable to make the locking protrusion disengage from the positioning cutout; wherein the fixing member further comprises a resisting portion formed between the first positioning bar and the second positioning bar; the receiving base further forms an elastic member resisting the resisting portion; the elastic member has a first arc portion and two second arc portions respectively connected to opposite ends of the first arc portion, and the first arc portion resists the resisting portion.

2. The card holder of claim 1, wherein the fixing member further comprises two restricting portions formed between the first positioning bar and the second positioning bar, the restricting portions are positioned at a side of the resisting portion away from the side wall, and resisting the receiving base.

3. The card holder of claim 1, wherein the first arc portion forms a protrusion resisting the resisting portion.

4. The card holder of claim 1, wherein the receiving base comprises a bottom plate and a plurality of side plates connected to the bottom plate, the bottom plate and the side plates cooperatively define a receiving groove.

5. The card holder of claim 1, wherein the positioning hook comprises an elastic arm and an unlocking portion connected to an end of the elastic arm, and an end of the elastic arm connected to the unlocking portion forms the locking protrusion.

6. The card holder of claim 1, wherein the receiving base is integrally formed by plastic or metal.

7. The card holder of claim 4, wherein the bottom plate defines a through hole in an end thereof, and the elastic member is formed across the through hole.

8. The card holder of claim 5, wherein the receiving base defines an unlocking hole in the end adjacent to the elastic arm.

9. The card holder of claim 7, wherein the bottom plate further defines a cutout in the other end away from the through hole, and the positioning hook is formed in the cutout.

10. An electronic device, comprising:
a card holder for receiving a chip card, comprising:
a fixing member comprising a base plate and a side wall substantially perpendicularly extending from an end of the base plate, wherein the base plate forms a first positioning bar and a second positioning bar substantially parallel to each other, and the second positioning bar defines a positioning cutout, the side wall defines an restricting groove; and
a receiving base positioned on the fixing member and partially received in the restricting groove, wherein the receiving base forms a positioning hook, the positioning hook has a locking protrusion engaging in the positioning cutout of the second positioning bar, and the positioning hook is elastically deformed to make the locking portion disengaged from the positioning cutout; wherein the fixing member further comprises a resisting portion formed between the first positioning bar and the second positioning bar; the receiving base further forms an elastic member resisting the resisting portion; the elastic member has a first arc portion and two second arc portions respectively connected to opposite ends of the first arc portion, and the first arc portion resists the resisting portion; and
a housing defining a receiving groove receiving the card holder.

11. The electronic device of claim 10, wherein the fixing member further comprises two restricting portions formed between the first positioning bar and the second positioning bar, the restricting portions are positioned at a side of the resisting portion away from the side wall, and resisting the receiving base.

12. The electronic device of claim 10, wherein the first arc portion forms a protrusion resisting the resisting portion.

13. The electronic device of claim 10, wherein the receiving base comprises a bottom plate and a plurality of side plates connected to the bottom plate, and the bottom plate and the side plates cooperatively define a receiving groove for receiving the chip card.

14. The electronic device of claim 10, wherein the positioning hook comprises an elastic arm and an unlocking portion connected to an end of the elastic arm, an end of the elastic arm connected to the unlocking portion forms the locking protrusion.

15. The electronic device of claim 13, wherein the bottom plate defines a through hole in an end thereof, and the elastic member is formed across the through hole.

16. The electronic device of claim 15, wherein the bottom plate further defines a cutout in the other end thereof away from the through hole, and the positioning hook is formed in the cutout.

* * * * *